United States Patent [19]

Murray

[11] Patent Number: 4,927,165
[45] Date of Patent: May 22, 1990

[54] MASTER/SLAVE HYDRAULIC SYSTEM FOR ADJUSTING THE SUPPORT WHEELS OF AN ARTICULATED IMPLEMENT

[75] Inventor: David L. Murray, Lee's Summit, Mo.

[73] Assignee: Deutz-Allis Corporation, Norcross, Ga.

[21] Appl. No.: 315,491

[22] Filed: Feb. 27, 1989

[51] Int. Cl.$^5$ ............................................. B62D 33/08
[52] U.S. Cl. .................................................. 280/43.23
[58] Field of Search ..................... 280/43.23, 491, 411, 280/412, 413, 656

[56] References Cited

U.S. PATENT DOCUMENTS

| | | | |
|---|---|---|---|
| 4,360,215 | 11/1982 | Nohl et al. | 280/43.23 |
| 4,427,207 | 1/1984 | Gafford | 280/43.23 |
| 4,506,898 | 3/1985 | Herron | 280/43.23 |

Primary Examiner—Richard A. Bertsch
Attorney, Agent, or Firm—Charles L. Schwab

[57] ABSTRACT

A wide agricultural implement includes a pair of pivotally interconnected frame sections which allow the implement to better follow the contour of the ground. Each frame section is supported by vertically adjustable wheels and a master/slave hydraulic system is employed to adjust the wheels.

2 Claims, 2 Drawing Sheets

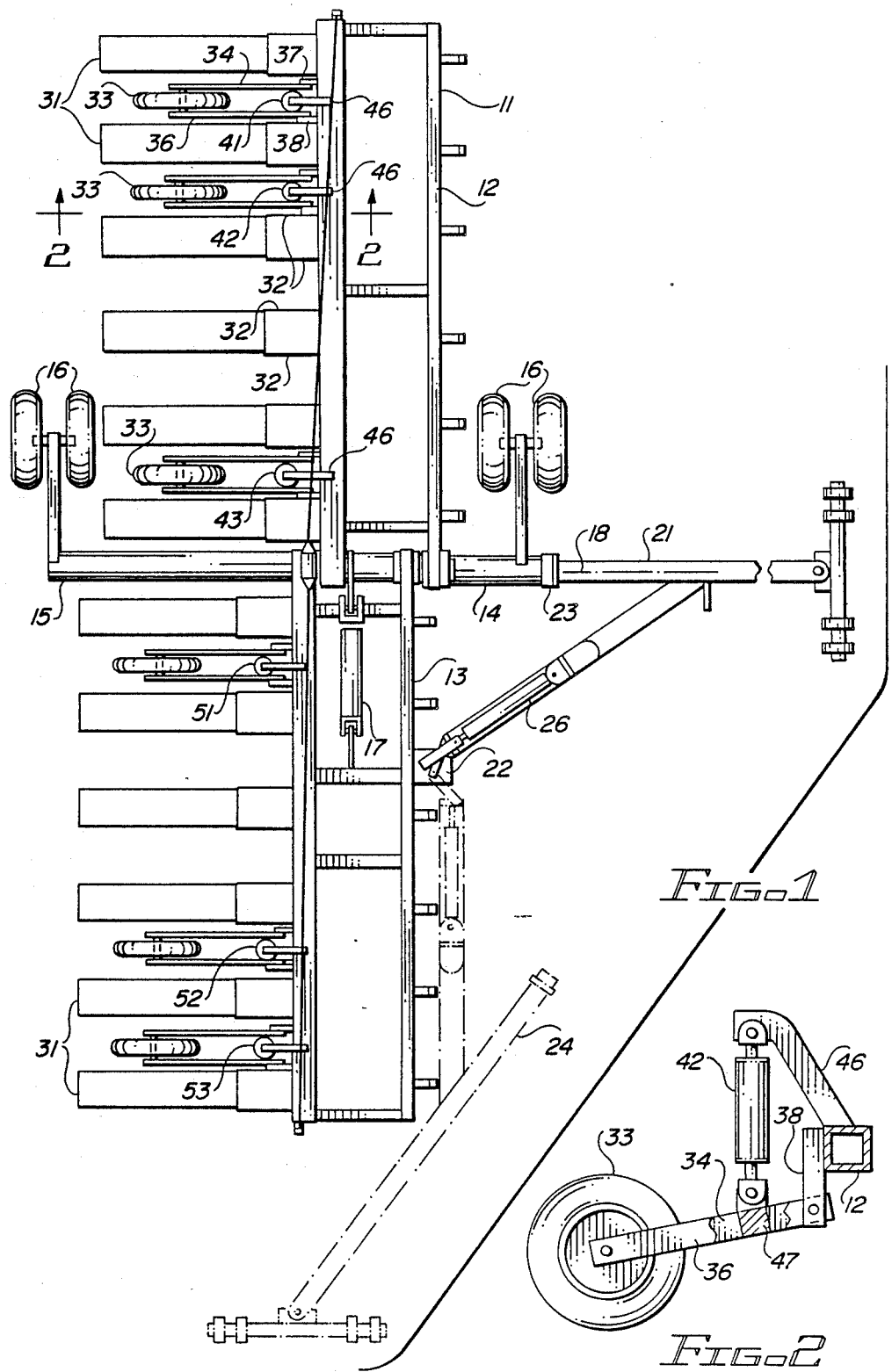

MASTER/SLAVE HYDRAULIC SYSTEM FOR ADJUSTING THE SUPPORT WHEELS OF AN ARTICULATED IMPLEMENT

TECHNICAL FIELD

This inventionn relates to an implement having a pair of articulated frame sections which are each supported by a plurality of wheels and more particularly to a master/slave hydraulic system which provides equalized stable wheel support for the implement and is operable to lower and raise the implement between working and field transport positions.

PRIOR ART STATEMENT

The prior art illustrated in FIG. 3 of the drawings is also shown and described in U.S. Pat. No. 4,427,207 issued Jan. 24, 1984 to A. T. Gafford for a Hydraulic System Providing Equalized Load on Implement Support Wheels. In the beforementioned prior art system a rigid implement frame is supported at one lateral side by a pair of wheels raised and lowered by a pair of parallel connected master cylinders and at the other lateral side by a pair of wheels raised and lowered by a pair of parallel connected slave cylinders. While this prior art master/slave hydraulic control system is suitable for raising and lowering a rigid frame, it is not a stable support for an implement frame articulated about a longitudinal axis extending in the direction the implement travels when performing field work. In the prior art hydraulic system shown in FIG. 4, the upper ends of three master cylinders partially supporting the rigid main frame section of the three section implement are connected in parallel to the control valve. One of the master cylinders is connected to a slave cylinder which also supports the main frame section and serves to stabilize it. The other two master cylinders are connected, respectively, to slave cylinders supporting wing sections pivoted to the main frame section. The bottom ends of the three slave cylinders are connected in parallel to the control valve. This prior art system is not suitable for supporting a wide implement with two frame sections centrally articulated on a longitudinal axis.

OBJECTS AND BRIEF SUMMARY OF THE INVENTION

It is a primary object of this invention to provide equalized wheel support for a wide implement frame which is centrally articulated about a longitudinal axis.

It is a further object of this invention to provide equalized wheel support for an articulated frame using a master/slave hydraulic system without special flow regulating devices such as flow dividers.

This invention provides a master/slave hydraulic system for controlling the support wheels of a wide implement frame having side-by-side sections pivoted about a longitudinal axis. Each section is supported by at least one laterally inner and one laterally outer wheel. A master jack is operatively associated with each of the wheels supporting one section and a slave jack is opeatively associated with each of the wheels supporting the other section. First corresponding ends of the jacks are connected to one or the other of the frame sections and second corresponding ends of the jacks are connected to the wheels. The hydraulic system includes a source of pressure fluid and a control valve having raise, lower and hold control positions and a pair of supply ports. First conduit means connect the first corresponding ends of the master jacks in parallel to one operating port of the control valve and second conduit means connect the second corresponding ends of the slave cylinders to the other supply port. A conduit connects the second end of the laterally outer master jack to a first end of the laterally inner slave jack and another conduit connects the second end of the laterally inner master jack to the first end of the laterally outer slave jack. This hydraulic system provides stable, equalized support for the pivoted frame sections while permitting articulation.

BRIEF DESCRIPTION OF THE DRAWINGS

One embodiment of the invention and two prior art devices are illustrated in the drawings in which:

FIG. 1 is a top view of a twelve-row planter incorporating the invention;

FIG. 2 is a view taken along the line II—II in FIG. 1;

DETAILED DESCRIPTION OF THE DRAWINGS

Figure 3:
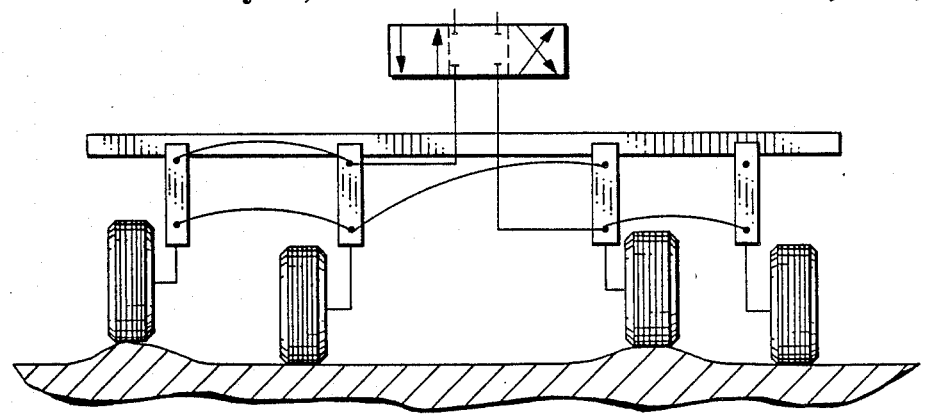
FIG. 3 of the drawings is a schematic illustration of a prior at master/slave hydraulic system for wheels supporting a rigid frame implement.
Figure 4:
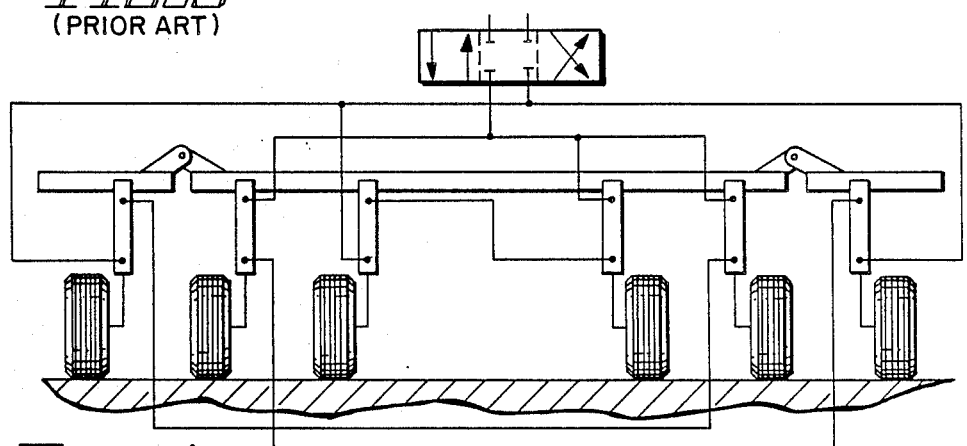
FIG. 4 of the drawings is a schematic illustration of a master/slave hydraulic system for wheels supporting an implement having a main frame and a pair of pivoted wing sections.

The general construction of the twelve-row planter illustrated in FIGS. 1 and 2 is shown and described in my co-pending U.S. patent application Ser. No. 07/296628 filed Jan. 13, 1989 for an Articulated Implement Frame With Swing Hitch.

Referring to FIGS. 1 and 2, the illustrated row crop planter includes a frame 11 comprised of first and second end-to-end frame sections 12, 13 having their laterally inner ends pivotally interconnected on a horizontal longitudinal axis 18 by a tubular component 14 of the rock shaft 15 which has arms mounting endwise transport wheels 16. The transport wheels 16 are raised and lowered relative to the frame 11 by contraction and extension of a double acting hydraulic jack 17 operatively interposed between the frame section 13 and the rock shaft. A swing hitch 21 is pivotally connected to the frame section 13 on a vertical pivot axis 22 and is releasably latched to the front end of the rock shaft component 14 by a latch mechanism 23. Upon release of the latch mechanism 23, the hitch may be swung to its endwise transport position shown in broken lines 24 by a double acting hydraulic jack 26. Twelve planting units 31 are mounted by parallel linkages 32 to the rear of the frame sections 12, 13. Three field support wheels 33 are rotatably supported on axles secured to the rear ends of beams 34, 36 which have their front ends pivotally connected to brackets 37, 38 secured to and extending rearwardly from the frame section 12. Three master jacks 41, 42, 43 in the form of linear double acting hydraulic actuators have their corresponding upper ends pivotally connected to upstanding brackets 46 and have their corresponding lower ends pivotally connected to a lateral strut 47 secured to and extending between the beams 34, 36. In a similar manner three slave jacks 51, 52, 53 have corresponding upper ends pivotally connected to brackets 46 on the frame section 13 and corresponding lower ends pivotally connected to struts interconnecting the beams 34, 36, which rotatably mount the three support wheels 33 for the frame section 13. The support wheels 33 are thus connected in vertically adjustable supporting relation to the laterally outer, intermediate and laterally inner portions of the frame sections 12, 13.

Figure 5:
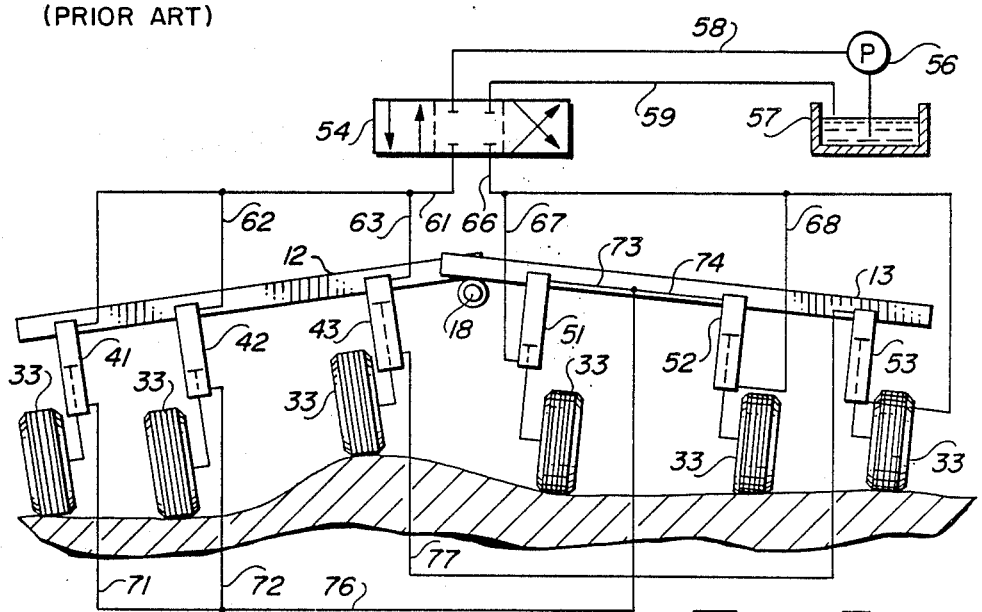
FIG. 5 is a schematic illustration of the master/slave hydraulic control system for the jacks controlling the support wheels of the planter shown in FIG. 1.

Referring to the schematic illustration of FIG. 5, a hydraulic control system for the master jacks 41, 42, 43 and slave jacks 51, 52, 53 includes a control valve 54 and a source of pressure fluid in the form of a pump 56 and fluid reservoir 57. The pump 54 is connected in fluid delivery relation to the inlet port of the valve 54 by a delivery line 58 and a return line 59 connects the exhaust or reservoir port of the valve 54 to the reservoir 57. Conduit means in the form of a jack supply line 61 are connected to a first supply port of the valve 54 and together with branch conduits 62, 63 establishes fluid communication between the supply port and the closed or upper ends of the cylinder components of the master jacks 41, 42, 43, thus connecting the upper ends of the master jacks 41, 42, 43 in parallel. Conduit means in the form of a jack supply conduit 66, which is connected to a second supply port of the valve 54, and branch conduits 67, 68 connect corresponding lower or rod ends of the valve jacks 51, 52, 53 in parallel to the valve 54. The lower or rod ends of the laterally outer and intermediate master jacks 41, 42 are connected in parallel with one another by fluid conduits 71, 72 and the upper ends of the laterally inner and intermediate slave jacks 51, 52 are connected in parallel by fluid conduits 73, 74. The lower ends of the master jacks 41, 42 are connected to the upper ends of the slave jacks 51, 52 by a conduit 76 which interconnects conduits 71, 72 with conduits 73, 74. The lower end of the laterally inner master jack 43 is connected in fluid communication with the upper end of the laterally outer slave jack 53 by a fluid conduit 7. This unique arrangement of interconnections between the lower ends of the master cylinders with the upper ends of the slave cylinders solves a stability problem which is inherent when a frame is comprised to two pivotally interconnected side-by-side sections. For instance, if the lower ends of the master jacks 41, 42, 43 were connected in parallel to one another and the upper ends of the slave jacks 51, 52, 53 were connected in parallel to one another and then the lower ends of master jacks 41, 42, 43 are connected to the upper ends of slave jacks 51, 52, 53, then the articulated tool bar frame shown in FIG. 5 would not be stable. By connecting the lower end of the laterally inner master jack 43 to the upper end of the laterally outermost slave jack 53 and by connecting the lower ends of the parallel connected master jacks 41, 42 to the parallel connected upper ends of the slave jacks 51, 52, a stable support for the frame is provided while allowing articulation of the frame about its longitudinal horizontal pivot axis 18 and equalization of support by the wheels as uneven ground is encountered.

In operation the distance by which the parallel connected master jacks 41, 42 position the laterally outer end of the frame section 12 above the ground will also be the approximate distance parallel connected slave jacks 51, 53 position the laterally inner end of frame section 13 above the ground. Since the laterally inner end of frame section 13 is pivotally connected to frame section 12, the laterally inner end of frame section 12 must also be positioned approximately at the same height above the ground. Thus, the master jack 43 will be extended to support the inner end of the frame section at the height dictated by the extended condition of slave jacks 51, 52 and the slave jack 53 will be extended to the same extent as the master jack 43 because of the master/slave relationship between them.

The master/slave hydraulic system of this invention provides equalized wheel support for a wide implement which is articulated near its midpoint to facilitate operation over uneven terrain. The system is void of flow dividers and uses conventional hydraulic lines, valve and pump. In the illustrated embodiment of the invention three master hydraulic jacks are used to support one frame section and three slave hydraulic jacks are used to support the other frame section. In a narrower articulated implement I would eliminate the master jack 42 and the slave jack 52. In a wider articulated implement I would replace the master jack 43 with a pair of parallel connected master jacks and would replace slave jack 53 with a pair of parallel connected slave jacks.

The embodiments of the invention in which an exclusive property or privilege is claimed are defined as follows:

1. A wide implement comprising:
    a main frame having a pair of frame sections extending laterally in end-to-end relation to one another with their adjacent laterally inner ends pivotally connected on a longitudinal horizontal axis extending in the direction the implement travels during a field working operation,
    laterally spaced inner and outer support wheels connected in vertically adjustable supporting relation to the laterally inner portion and laterally outer portion, respectively, of each of said frame sections, and
    an hydraulic control system providing equalized wheel support for said implement including
    a laterally outer hydraulic master jack operatively interconnected between one of said frame sections and the laterally outer support wheel adjustably connected thereto
    a laterally inner hydraulic master jack operatively interconnected between said one frame section and the laterally inner support wheel adjustably connected thereto
    a laterally outer hydraulic slave jack operatively interposed between the other frame section and the laterally outer support wheel adjustably connected thereto
    a laterally inner hydraulic slave jack operatively interposed between said other frame section and the laterally inner support wheel adjustably connected thereto, said jacks being linearly extensible and contractible and having corresponding first and second ends
    a source of pressurized hydraulic fluid including a pump and a fluid reservoir
    a control valve having raise, lower and hold positions of adjustment and connected in fluid receiving relation to said pump and in fluid return relation to said reservoir, said valve presenting a pair of supply ports,
    conduits connecting said first corresponding ends of said master jacks in parallel to one of said supply ports,
    a conduit connecting said second end of the laterally outer master jack to said first end of said laterally inner slave jack, a conduit connecting said second end of said laterally inner master jack to send first end of said laterally outer slave jack and conduits connecting said secondn ends of said slave jacks in parallel to the other of said supply ports of said valve.

2. The implement of claim 1 and further comprising a first intermediate support wheel connected in vertically adjustable supporting relation to an intermediate portion of said one frame section, a second intermediate support wheel connected in vertically adjustable supporting relation to an intermediate portion of said other frame section, an intermediate master jack operatively interconnected between said one frame section and said first intermediate support wheel, an intermediate slave jack operatively interconnected between said other frame section and said second intermediate support wheel, conduit means connecting said intermediate master jack in parallel with one of said laterally inner and outer master jacks and conduit means connecting said intermediate slave jack in parallel with the slave jack whose first end is connected to the second end of said one master jack.

* * * * *